(12) United States Patent
Cheriton

(10) Patent No.: US 9,898,410 B2
(45) Date of Patent: Feb. 20, 2018

(54) HYBRID MAIN MEMORY USING A FINE-GRAIN LEVEL OF REMAPPING

(71) Applicant: Intel Corporation, Santa Clara, CA (US)

(72) Inventor: David R. Cheriton, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 14/479,676

(22) Filed: Sep. 8, 2014

(65) Prior Publication Data

US 2015/0074339 A1    Mar. 12, 2015

Related U.S. Application Data

(60) Provisional application No. 61/876,115, filed on Sep. 10, 2013.

(51) Int. Cl.
*G06F 12/0862* (2016.01)
*G06F 12/0804* (2016.01)
(Continued)

(52) U.S. Cl.
CPC ...... *G06F 12/0862* (2013.01); *G06F 12/0804* (2013.01); *G06F 12/0868* (2013.01);
(Continued)

(58) Field of Classification Search
CPC ............. G06F 12/0862; G06F 12/0804; G06F 12/0868; G06F 12/0246; G06F 12/0897;
(Continued)

(56) References Cited

U.S. PATENT DOCUMENTS

| | | | |
|---|---|---|---|
| 2005/0235131 A1* | 10/2005 | Ware | G06F 12/0292 711/203 |
| 2008/0162881 A1* | 7/2008 | Welc | G06F 9/526 712/206 |

(Continued)

FOREIGN PATENT DOCUMENTS

| | | |
|---|---|---|
| CN | 101622606 A | 1/2010 |
| CN | 101853143 A | 10/2010 |

(Continued)

OTHER PUBLICATIONS

Duarte, Gustavo. "Cache: A Place for Concealment and Safekeeping". Published Jan. 11, 2009. <http://duartes.org/gustavo/blog/post/intelcpucaches/>. Retrieved Apr. 19, 2017.*

(Continued)

*Primary Examiner* — Charles Rones
*Assistant Examiner* — Hewy Li
(74) *Attorney, Agent, or Firm* — Schwabe, Williamson & Wyatt, P.C.

(57) ABSTRACT

Accessing a hybrid memory using a translation line is disclosed. The hybrid memory comprises a first portion. The translation line maps a first physical memory address to a first line in the first portion. Said mapping provides an indication that the first line is not immediately accessible in the first portion.

27 Claims, 8 Drawing Sheets

(51) Int. Cl.
*G06F 12/0868* (2016.01)
*G06F 3/06* (2006.01)
*G06F 12/02* (2006.01)
*G06F 12/0897* (2016.01)

(52) U.S. Cl.
CPC .......... *G06F 3/068* (2013.01); *G06F 12/0246* (2013.01); *G06F 12/0897* (2013.01); *G06F 2212/1024* (2013.01); *G06F 2212/1028* (2013.01); *G06F 2212/1044* (2013.01); *G06F 2212/205* (2013.01); *G06F 2212/7201* (2013.01); *Y02B 60/1225* (2013.01)

(58) Field of Classification Search
CPC ............. G06F 3/068; G06F 2212/1024; G06F 2212/1028; G06F 2212/1044; G06F 2212/205; G06F 2212/7201; Y02B 60/1225
See application file for complete search history.

(56) References Cited

U.S. PATENT DOCUMENTS

| | | | | |
|---|---|---|---|---|
| 2008/0162885 A1* | 7/2008 | Wang | .................... | G06F 9/3004 712/214 |
| 2008/0162886 A1* | 7/2008 | Saha | .................... | G06F 9/3004 712/214 |
| 2008/0162990 A1* | 7/2008 | Wang | .................... | G06F 9/3863 714/19 |
| 2008/0163220 A1* | 7/2008 | Wang | .................... | G06F 8/458 718/101 |
| 2008/0270745 A1* | 10/2008 | Saha | .................... | G06F 9/3834 712/1 |
| 2009/0006767 A1* | 1/2009 | Saha | .................... | G06F 8/458 711/145 |
| 2009/0172305 A1* | 7/2009 | Shpeisman | .......... | G06F 9/3834 711/154 |
| 2011/0145516 A1* | 6/2011 | Adl-Tabatabai | ........ | G06F 8/458 711/152 |
| 2012/0191900 A1* | 7/2012 | Kunimatsu | ......... | G06F 12/0223 711/103 |
| 2013/0332660 A1* | 12/2013 | Talagala | ............. | G06F 12/0246 711/103 |
| 2014/0281145 A1* | 9/2014 | Tomlin | ............... | G06F 12/0246 711/103 |

FOREIGN PATENT DOCUMENTS

| | | |
|---|---|---|
| CN | 103106050 A | 5/2013 |
| WO | 2013101053 A1 | 7/2013 |

OTHER PUBLICATIONS

First Office Action dated Feb. 28, 2017, issued in related Chinese Patent Application for Invention No. 201410522999.6, 25 pages.

* cited by examiner

HYBRID MAIN MEMORY USING A FINE-GRAIN LEVEL OF REMAPPING

CROSS REFERENCE TO OTHER APPLICATIONS

This application claims priority to U.S. Provisional Patent Application No. 61/876,115 entitled HYBRID MAIN MEMORY USING A FINE-GRAIN LEVEL OF REMAPPING filed Sep. 10, 2013 which is incorporated herein by reference for all purposes.

BACKGROUND OF THE INVENTION

With the falling cost of volatile memory, for example dynamic random access memory ("DRAM"), and corresponding increase in capacity, it is now feasible for many applications to maintain a substantial amount of their state in DRAM memory, namely gigabytes of DRAM. The result is faster, more predictable response, compared to paging this state back and forth between secondary storage, such as disk and main memory, conventionally DRAM.

This has widened the gap in predictability of performance between applications that fit in memory and those that do not, for example those that require several terabytes of data rather than just several gigabytes of memory. Moreover, these large applications suffer further because of the software overheads and latency to fetch data from a secondary storage.

BRIEF DESCRIPTION OF THE DRAWINGS

Various embodiments of the invention are disclosed in the following detailed description and the accompanying drawings.

DETAILED DESCRIPTION

Figure 1:
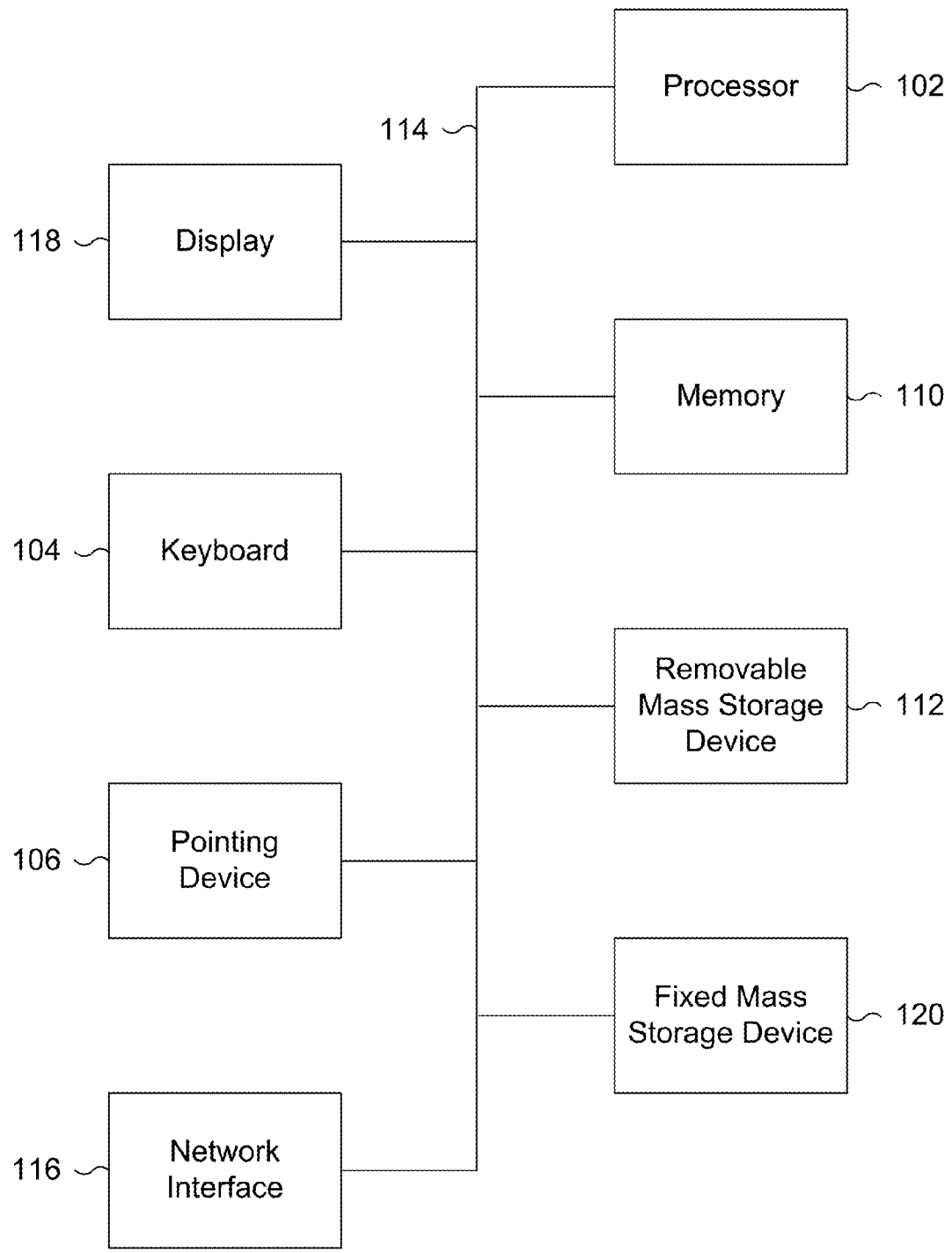
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A hybrid main memory using a fine-grain level of remapping is disclosed. As stated above, the gap is widening in predictability of performance between applications that fit in main memory and those that do not, for example those that require several terabytes of data rather than just several gigabytes of memory. Moreover, these large applications suffer further because of the software overheads and latency to fetch data from a secondary storage.

Volatile Memory Definition.

Throughout this specification the term "volatile memory" refers generally and without limitation to memory technologies requiring power to maintain stored data and/or typically used for main memory, primary memory, computer memory, conventional memory, and/or primary storage, or any memory with similar performance including random access memory ("RAM"), DRAM, static RAM ("SRAM"), synchronous DRAM ("SDRAM"), asynchronous RAM, double data rate SDRAM ("DDR SDRAM"), thryistor RAM ("TRAM"), zero-capacitor RAM ("ZRAM"), and so forth. Throughout this specification the term DRAM without limitation refers generally to volatile memory.

For example, a conventional database divides the data into blocks that are stored on disk yet cached in main memory in a disk cache. Thus, access to the data stored on disk requires:

a) mapping an identification of the data to the blockId of the block containing the data, and optionally an offset, b) determining the memory location of this block if it is present in the block cache and otherwise, initiating an I/O operation to move the data into this block cache and then c) locking the block into the block cache while it is being used by the application. By contrast, an in-memory record can be accessed by simply dereferencing a pointer to the record containing the data.

Besides the prohibitive capital cost to providing terabyte-scale amounts of volatile memory and power cost to maintain such a large memory, a large memory can require excessive recovery time on reboot. For instance, a terabyte of data requires roughly 1000 seconds or 16 minutes to recover/reload the data if the data to recover is provided at 10 Gbps over a conventional Ethernet network, a challenging rate in itself.

A large main memory may also suffer from excessive memory errors, as the probability of memory errors is proportional to the size of memory. The increased exposure to memory errors and the long recovery time can combine to significantly reduce the availability and response levels of a system or application.

Non-Volatile Memory Definition.

Alternative memory such as non-volatile memory have been developed or are being developed that provide far greater capacity while also providing persistence. Throughout this specification the term "non-volatile memory" refers generally and without limitation to memory technologies that can store data even when not powered and/or typically used for computer storage, or any memory with similar performance including flash memory, non-volatile RAM ("NVRAM"), resistive RAM ("RRAM"), phase-change memory ("PCM"), phase-change RAM ("PRAM"), non-volatile SRAM ("nvSRAM"), ferroelectric RAM ("FRAM"), magnetoresistive RAM ("MRAM"), programmable metallization cell ("PMC"), SONOS, nanoRAM, and so forth. Non-volatile memory may also refer to a memory technology with more dense or more power efficient memory technologies than DRAM.

Unfortunately, the performance of these technologies is substantially lower than volatile memory, either for read or write or both. They may also entail lower write endurance and higher write power and impose restrictions such as requiring block erase.

At the same time, there is a trend towards increasing use of "huge" memory pages, for example, two megabyte pages on industry standard architectures. This means that conventional virtual paging mapping approaches to migrating and remapping data at a page granularity incur excessive overhead on applications.

Hybrid Memory Definition.

Incorporating alternative and/or non-volatile memory technology into a volatile memory and/or main memory system as a hybrid main memory system, while achieving performance that is sufficiently close to volatile memory, would address the above issues. Main memory realized as a hybrid combination of conventional memory technology and/or volatile memory, for example DRAM, and an alternative memory technology and/or non-volatile memory, for example flash memory, is disclosed. Throughout this specification a "hybrid" memory and/or hybrid main memory refers generally and without limitation to any combination of volatile/conventional and non-volatile/alternative memory.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The block processor 102 may also include a coprocessor (not shown) as a supplemental processing component to aid the processor and/or memory 110. As will be described below, the memory 110 may be coupled to the processor 102 via a memory controller (not shown) and/or a coprocessor (not shown), and the memory 110 may be a conventional memory, a structured memory, a hybrid memory of volatile and non-volatile memory as described above, or a combination thereof.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Physical Memory Definition.

Throughout this specification a "physical memory realization", or physical memory and/or physical memory device, refers primarily to tangible primary memory of a computer system. In some embodiments, primary memory includes a semiconductor memory. In some embodiments, the semiconductor memory includes a volatile and/or non-volatile memory. Examples of physical memory include but are not limited to one or more of the following: RAM, dynamic RAM (DRAM), static RAM (SRAM), flash memory, programmable ROM (PROM/EPROM/EEPROM), non-volatile RAM (NVRAM), flash memory, NAND based memory, NOR based memory, and all forms of addressable semiconductor memory.

Figure 2:
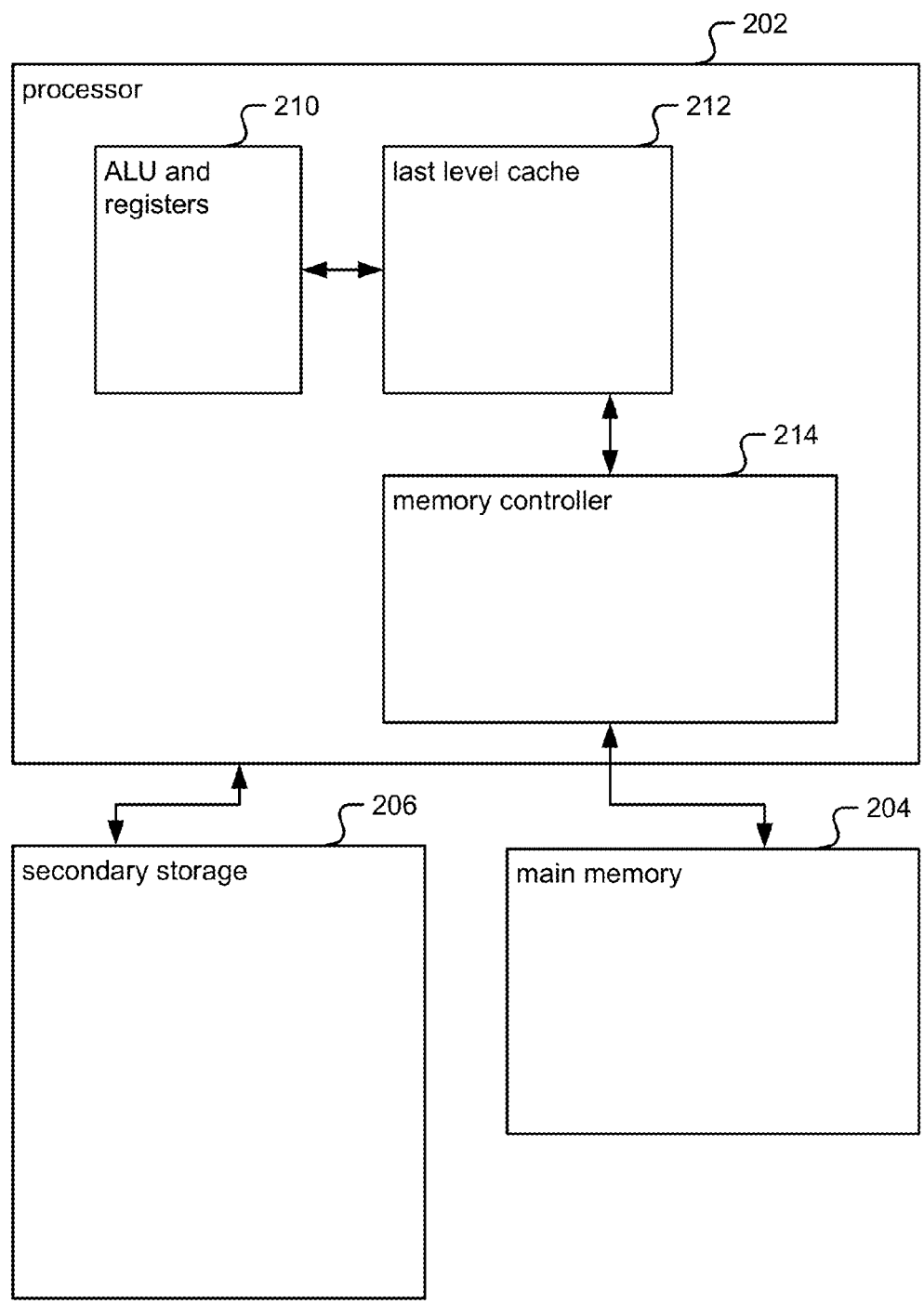
FIG. 2 is a block diagram illustrating a logical view of an embodiment of an architecture for a traditional memory hierarchy.

FIG. 2 is a block diagram illustrating a logical view of an embodiment of an architecture for a traditional memory hierarchy. Processor 202 is coupled both to main (volatile) memory 204 and to secondary storage (e.g. disk or flash) 206. The processor 202 may be comprised of one or more cores, registers, and/or cache/cache hierarchy 210 coupled to a last level cache ("LLC") 212. The LLC 212 is coupled to a memory controller 214. The bus interfaces within the processor can be considered high performance in comparison to the memory bus that couples memory controller 214 with main memory 204, a current example might be a DDR3 bus with 12,800 MB/s transfer rate. In turn, the memory bus is itself higher performing than the peripheral connection bus coupling the processor 202 to the secondary storage 206, a current example might be a PCIe bus via SATA 3 with 600 MB/s transfer rate.

Figure 3:
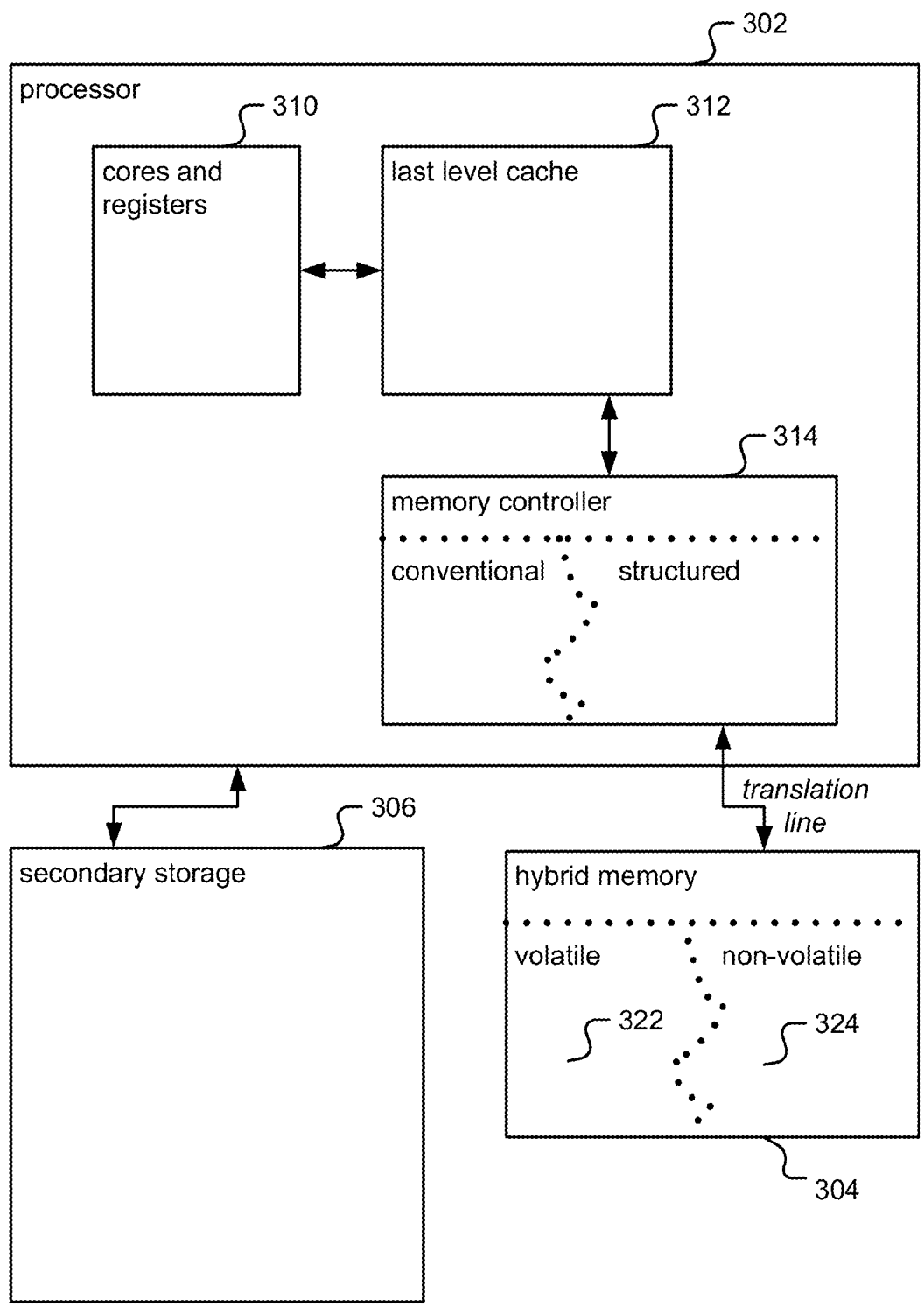
FIG. 3 is a block diagram illustrating a logical view of an embodiment of an architecture for a hybrid memory.

FIG. 3 is a block diagram illustrating a logical view of an embodiment of an architecture for a hybrid memory. Similar to FIG. 2, processor 302 is coupled with hybrid memory 304 and secondary storage 306. The processor 302 may be comprised of one or more cores, registers, and/or cache/ cache hierarchy 310 coupled to a LLC 312. The LLC 312 is coupled to a structured memory controller 314. Although the memory controller 314 is depicted in FIG. 3 as being part of the processor 302, it may without loss of generality be located outside of processor 302, for example as a coprocessor (not shown) or a separate package (not shown). The memory controller 314 may without loss of generality be a combined conventional and structured memory controller or a pure structured memory controller (not shown). Memory controller 314 is coupled via a set of translation lines to hybrid memory 304, wherein hybrid memory 304 is comprised of volatile memory 322 and non-volatile memory 324.

On access to a physical address specifying the alternative memory technology 324, the line contents are moved to DRAM 322 by the memory controller 314, and a hardware remapping is used to remap subsequent accesses to this address and other addresses in the line to the content in DRAM 322, if it has been migrated there. Modified data is also moved back to the alternative memory technology 324 at appropriate times, reverting the remapping to indicate this.

Main memory 304 as a hybrid of conventional/volatile memory technology 322 and an alternative/non-volatile memory technology 324 is disclosed. In one embodiment, the main memory controller 314 provides the processor 302 with access state in both the conventional 322 and alternative memory 324 technology, using a physical memory address to specify the content to be read or written.

Memory Controller Definition.

Throughout this specification the term "memory controller" is used to designate hardware that handle memory loads and stores and may include portions of what is normally referred to in the art as the LLC and its controller, and may also refer to portions of the first and second level cache controllers.

Hardware memory remapping is related to, for example, structured memory. Such memory with a structured memory controller may perform fine grained online remapping of physical memory along with other properties. The hybrid memory controller in this specification can be thought of as a broader and/or more general-purpose controller than a structured memory controller, but several concepts are common between the two for illustrative purposes. For example, translation indirection used for deduplication in a structured memory is a concept analogous for translation indirection for caching hierarchy remapping.

One example of a structured memory system/architecture is HICAMP (Hierarchical Immutable Content-Addressable Memory Processor) as described in U.S. Pat. No. 7,650,460 entitled HIERARCHICAL IMMUTABLE CONTENT-ADDRESSABLE MEMORY PROCESSOR which is hereby incorporated by reference in its entirety, and as described in US Patent Application US 2011/0010347 A1 filed Jul. 23, 2010 entitled ITERATOR REGISTER FOR STRUCTURED MEMORY, which is hereby incorporated by reference in its entirety.

Such a special memory access path can provide other properties, as detailed in U.S. Pat. No. 7,650,460, such as sharing, deduplication, efficient snapshots, compression, sparse dataset access, and/or atomic update.

By extending rather than replacing the conventional memory, software can be reused without significant rewriting. In one embodiment, some of the benefits of a structured memory like HICAMP may be provided to a conventional processor/system by providing structured capabilities as a specialized coprocessor and providing regions of the physical address space with read/write access to structured memory by the conventional processors and associated operating system as disclosed in U.S. Pat. No. 8,407,428 entitled STRUCTURED MEMORY COPROCESSOR, which is hereby incorporated by reference in its entirety.

More generally and throughout this specification, a physical memory system is realized with a physical address translation mapping between physical addresses and the actual physical memory realization and/or device, with the unit of mapping being independent of the virtual memory page size.

Throughout this specification this unit of mapping is referred to as a "physical memory line", or line for brevity. This translation mapping may be changed to map the associated address to a separate line with the same data content. By remapping the address, all the contiguous physical addresses that map to the same physical line are remapped. Throughout this specification a "line address" refers to a physical address that is mapped to a physical line, for example, that is used when the entire line contents is read as a single operation. Throughout this specification a "physical line ID" or PLID refers to the name of the identification of a unit of storage in the physical memory system that is capable of storing the contents of a physical line. Thus, a line address is mapped to a PLID, which identifies the content of the line. In one embodiment, one or more line addresses may be mapped to the same PLID.

In one embodiment, the mapping is performed by one or more "translation lines", which throughout this specification refers to a line which corresponds to a contiguous range of physical addresses, and contains a sequence of PLIDs, one for each line unit of content in this range of addresses. For example, a 64-byte translation line can contain 16 32-bit PLIDs, thereby representing a 1024-byte range of physical addresses, assuming a 64-byte data line as described in U.S. Pat. No. 8,407,428.

Throughout this specification, "hardware" refers to any physical configuration of digital circuits to perform a task, including custom silicon integrated circuits, application specific integrated circuits ("ASICs"), field programmable gate arrays ("FPGAs") or programmable logic devices ("PLDs.") The translation line mapping described is a hardware, rather than software (for example, operating system) system that does not require software resources and/or operating system resources to be realizable. The memory controller described does not need to be implemented at all in software and may be completely implemented in hardware.

In one embodiment, a level of indirection is provided between the physical address used by the processor and the actual memory contents location, designated by a PLID. In one embodiment, this level of indirection is implemented by a translation line that corresponds to a portion of the physical address space. This translation line contains a plurality of PLIDs, one for each line unit in the physical address range that it covers. In a specific embodiment, each data line is 64 bytes and each PLID is 40 bits or five bytes, allowing seven PLIDS to be stored per line, or eight PLIDs with extra hidden bits per line. Thus, each translation line covers 1024 bytes of physical address space. With 37 bits of addressing and three bits of metatags per PLID, this allows up to eight terabytes of main memory to be addressed. The translation lines in DRAM 322 only reference PLIDs that refer to DRAM data lines so these can be 32 bits each, allowing 64 gigabytes of DRAM to be addressed, assuming just two bits of metatag data.

Metatags may be used to indicate a line is modified. It can also be used in some embodiments to indicate that the line is being transferred to DRAM 322 and not yet able. Other uses of metatags are described in U.S. patent application Ser. No. 13/712,878 entitled HARDWARE-SUPPORTED PER-PROCESS METADATA TAGS filed Dec. 12, 2012, which is hereby incorporated by reference in its entirety.

In one embodiment, on a read to a physical address specifying the alternative memory area 324, the memory controller 314 reads the translation line corresponding to this address, and then reads the data line specified by the translation line and allows the processor 302 to continue using the data line contents, typically loaded at this point into the processor LLC 312. The memory controller remapping mechanism stores this translation line, revising the PLIDs in this cached translation line as data lines are migrated to DRAM 322. The memory controller then generates an indication to perform the page remapping once all of the PLIDs have been changed to point to data lines in DRAM 322. The translation line can be marked as modified as well so it is then written to an associated translation line in DRAM 322, corresponding to a physical address associated with the migrated page. At this point, processor 302 access to any line in this page of memory is serviced by the associated page in DRAM 322, providing conventional main memory performance. The operating system is informed of this page migration, so can ensure that all processes are aware of this migration to ensure consistency. Page remapping may occur as soon as the translation line(s) corresponding to the new page have been initialized to either point at the correct data lines or tagged to indicate that that is pending, assuming the processor checks for this "pending" tag.

Hybrid Main Memory using a Fine-grain Level of Remapping.

Figure 4A:
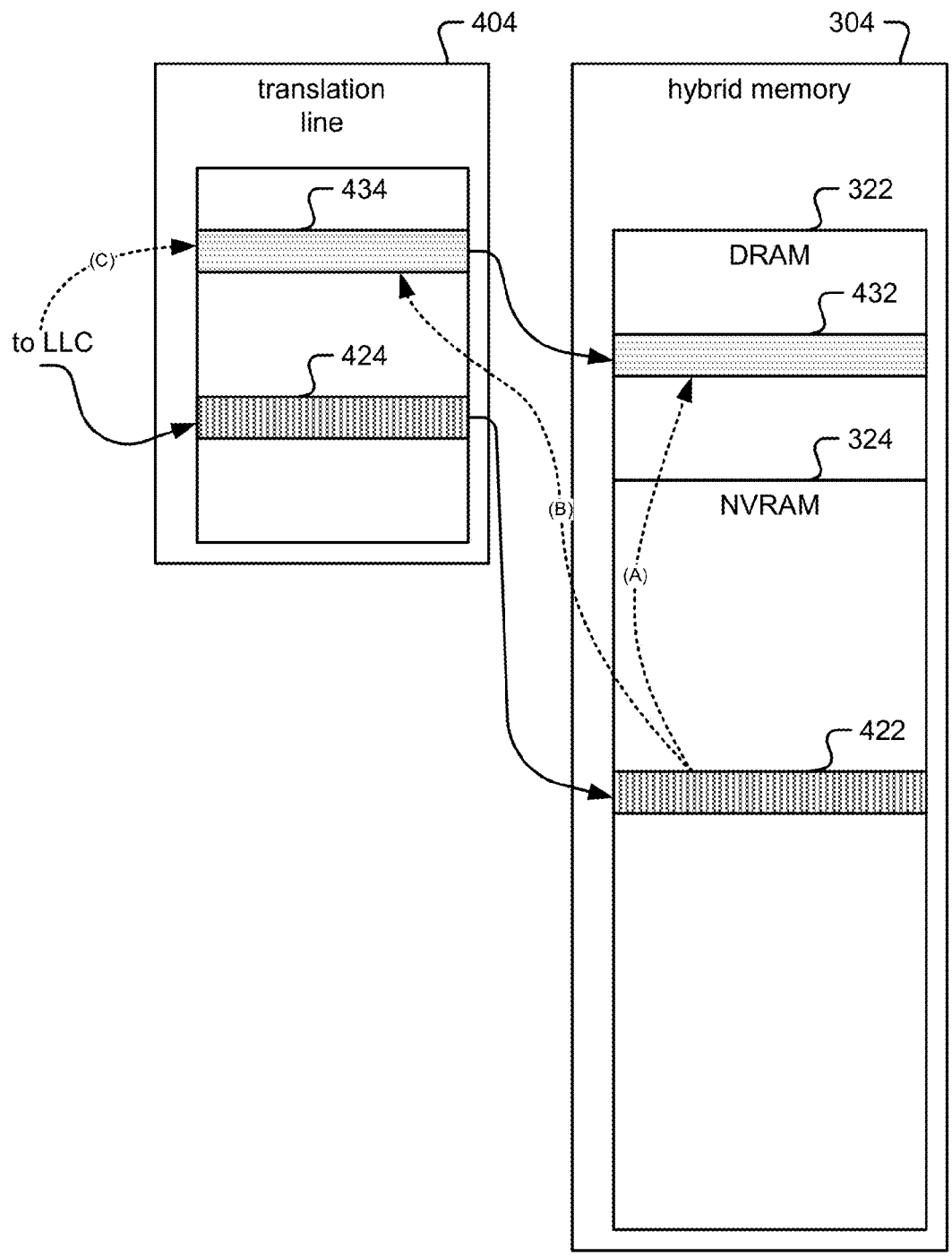
FIG. 4A is a conceptual illustration of the memory controller and hybrid memory remapping.

FIG. 4A is a conceptual illustration of the memory controller and hybrid memory remapping. Hybrid memory 304 is coupled to translation line 404, and hybrid memory 304 comprises DRAM 322 and NVRAM 324. Translation line 404 can for example reside in the LLC 312. Translation line 404 comprises a plurality of PLIDs, for example PLID 424 and PLID 434. On access to a physical address corresponding to a state stored in a line 422 in NVRAM 324 with associated translation line PLID 424, the memory controller 314 retrieves said state, (A) allocates space for this content in DRAM/volatile memory 322 shown as a line 432, (B) associates revised translation line PLID 434, and (C)

updates the memory remapping for the processor with revised translation line PLID 434 to indicate that content corresponding to said physical address, and other addresses corresponding to the same content line 432, is now located in DRAM/volatile memory 322.

Consequently, if the contents are modified and written back from the processor 302, for instance the LLC 312, it is written back to line 432 in DRAM 322. Similarly, if it is re-read, the data is retrieved from line 432 in DRAM 322.

Hybrid Memory Prefetch.

Figure 4B:
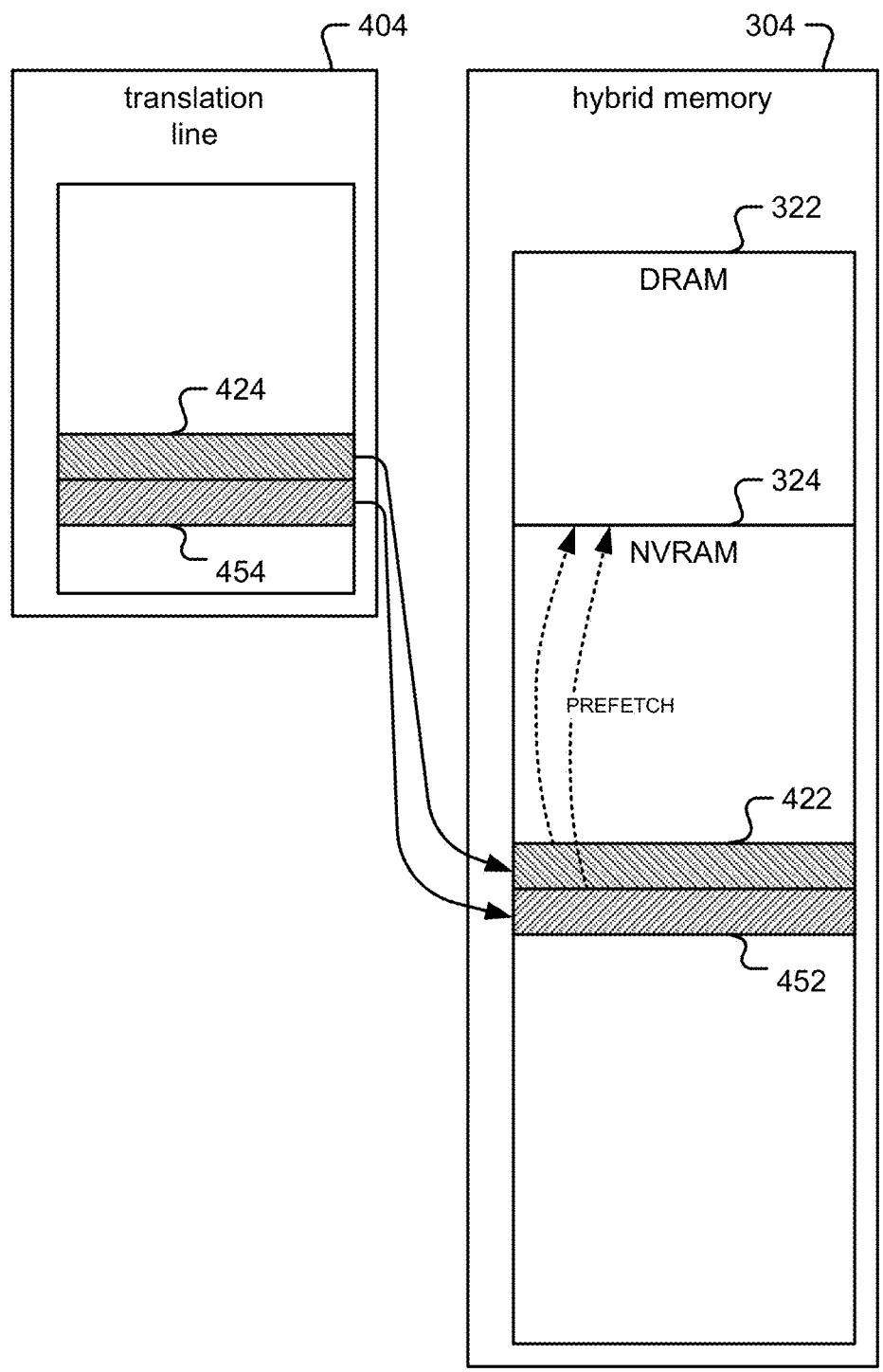
FIG. 4B is a conceptual illustration of prefetching for the memory controller and hybrid memory remapping.

FIG. 4B is a conceptual illustration of prefetching for the memory controller and hybrid memory remapping. In one embodiment, if the accessed line 422 was being read, adjacent lines 452 to the accessed line 422 are transferred from the alternative memory technology 414 to DRAM 412 concurrently with the processor being allowed to continue execution with this accessed line 422, the remapping for translation line PLID 454 being updated accordingly as described earlier. This optimistic transferring of data lines or "prefetching", recognizes the normal spatial locality of access to data.

In one embodiment, said optimistic prefetching is made conditional on one or more factors, such as: tags provided by the page tables, whether the access is to the first line of a page and other metadata maintained in the memory system.

Page Prefetch.

In one embodiment, the adjacent lines 454 are identified as those in the same "page" of memory as the accessed lines. Memory, whether physical or virtual, is often organized as pages. Virtual memory maps pages from traditional four kilobyte pages to "huge" pages of two megabytes. To prefetch a four kilobyte page would require in one embodiment 64 PLIDs or four translation lines. Thus this prefetching could be thought of as a paging process from NVRAM to DRAM.

In one embodiment, the memory controller 314 provides an indication when a page of content has been so migrated to DRAM 322, causing the page table for each process accessing this content to be updated to directly reference this page in DRAM 322. In such an embodiment, there is a range of physical memory addresses that correspond to the portion of main memory provided by DRAM 322.

In one embodiment, the memory controller remapping allows the processor to continue as soon as the specific requested memory line has been provided to the processor, rather than waiting for the entire page to be migrated to DRAM 322. The remapping capacity provided by the memory controller may be limited because more extensive remapping is provided by conventional virtual memory page tables, once a page has been fully migrated. Because the line access and remapping is handled in hardware (and not, for example, in software by the operating system or drivers), the processor can continue without incurring the cost of a so-called page-fault trap into the operating system to handle the page migration. Consequently, page migration from the alternative memory technology to DRAM incurs a relatively small penalty on application performance, especially compared to a conventional paging approach.

For example, on a page-fault, the memory controller 314: first suspends the processor; second determines a physical page address in DRAM 322 to use; third generates, remaps or transfers the translation line(s) for this page to the LLC so that each entry in each of these lines refer either to a DRAM line or a faulting address; fourth transfers the data line referenced by a translation entry for the faulting address, remapping the entry to DRAM 322; fifth allows the processor to resume; and sixth optionally prefetches the next lines associated with the same page. Thus instead of waiting for 64 lines in the case of 4 k pages, the processor need only wait for one (cache) line. This is further advantageous in the case of 2M pages, wherein instead of waiting for 32000 lines, the processor need only wait for one line. In one embodiment, a processor accessing a translation line with a faulting address waits until memory controller 314 has transferred the corresponding data line to DRAM 322 and updated the translation line accordingly. In one embodiment, the operating system provides a queue of free pages in DRAM 322 to use in the second step.

Figure 5:
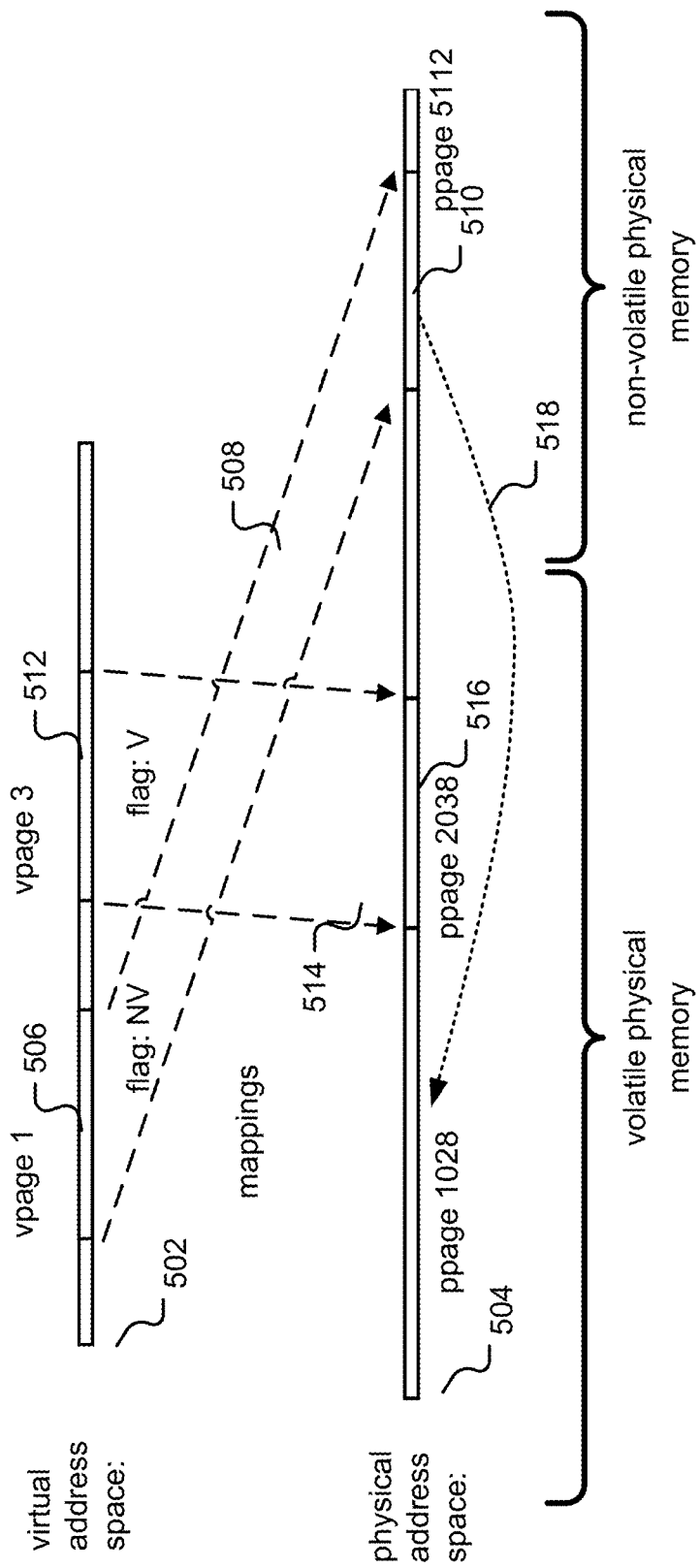
FIG. 5 is a conceptual illustration of the virtual and physical memory paging for a hybrid memory remapping.

FIG. 5 is a conceptual illustration of the virtual and physical memory paging for a hybrid memory remapping. Virtual address space 502 and physical address space 504 are depicted and the corresponding page mapping is shown in FIG. 5. For example, virtual page 1 (506) is shown, with a flag "NV" indicating that the virtual page 1 maps to a non-volatile physical memory. In this case, virtual page 1 maps (508) to physical page 5118 (510). Similarly, virtual page 3 (512) maps to volatile physical memory and thus a flag is set to "V". Virtual page 3 maps to physical page 2038 (516). Other tags might include an indication whether a page is read-only or read-writable. In one embodiment, the indication of non-volatile or volatile is encoded in the physical memory address. For example, all physical addresses larger than a specified physical address are designated as corresponding to non-volatile memory.

Thus, when a wanted line on virtual page 1 (506) is accessed, because the corresponding physical page 5118 is in NVRAM, the memory controller transfers the wanted line, frees the processor, and can continue to prefetch the remainder of the page, eventually copying it to physical page 1028 in DRAM (518).

Writeback.

In one embodiment, on write access to a line stored in the alternative memory technology, the remapping indicates that writeback is to take place in the DRAM location.

Write Trap.

In one embodiment, pages in alternative memory area are write-protected by the operating system/virtual memory hardware, so that a write causes a trap to software to handle this case, thereby simplifying the hardware support.

Dirty Tags to Reduce Writes.

In one embodiment, the data lines in a translation line in remapping state are written (back) to DRAM only on eviction from the LLC. One of the metadata tags can be used to indicate whether a line has been written, i.e. dirty. Thus, on migration of the page back to the alternative memory area, only the dirty lines and the translation line(s) need to be written in this alternative memory area. This thus reduces the number of writes and therefore the time required to migrate the page.

OS Page Migration.

In one embodiment, page-out or page migration is handled by the operating system following the conventional operating system approach to page-out. That is, it write-protects the DRAM page, updating the page in the alternative memory area as necessary, and then remaps the page table references to the DRAM page back to the page in the alternative memory area.

NVRAM Hardware Copy Mechanism.

In one embodiment, a memory hardware copy mechanism performs the transfer of modified data back to the alternative memory area 324, reducing the overhead on the processor/operating system.

NVRAM Wear Leveling.

In one embodiment using translation lines, data lines to be written in the alternative memory area can be written in memory locations chosen to achieve wear-leveling of the alternative memory, as required by some such technologies.

NVRAM Bulk Erase/Reclamation.

In one embodiment, new data lines can be written in a fashion to facilitate bulk erase or reclamation of blocks of alternative memory. For instance, new data lines could be written sequentially following a log-based structure, allowing a whole block of old lines to be erased at a time, for example such as when the log is truncated.

Deduplication.

In one embodiment using translation lines, the data lines can be shared between pages. The data lines may also and further be deduplicated in DRAM, for example as used in HICAMP as described in U.S. Pat. No. 7,650,460. Besides enabling DRAM 322 to provide a larger capacity for the same number of DRAM chips, the page migration cost is reduced because any duplicate lines need not be transferred. In one embodiment using translation lines, the data lines are deduplicated in the alternative memory area 324.

In one embodiment with deduplication in both the DRAM area 322 and in the alternative memory area 324, the number of lines to write for migration from the latter to the former is reduced by detecting that a line in a page to be migrated already exists in the DRAM area 322. Similarly, on migration of a page from DRAM 322 to the alternative memory area 324, the number of writes is reduced by this deduplication. For example, if all the data lines of a page to be migrated to the alternative memory area 324 already exist in this latter area, only the translation line needs to be written back to this alternative memory area 324. Thus, the deduplication reduces the writing to the alternative memory area 324, increasing the lifetime of this memory if it has limited write endurance. It also reduces the bandwidth and time required to migrate a page. These advantages are in addition to the increased efficiency and capacity provided by deduplication.

Transactional Update Support.

Figure 6:
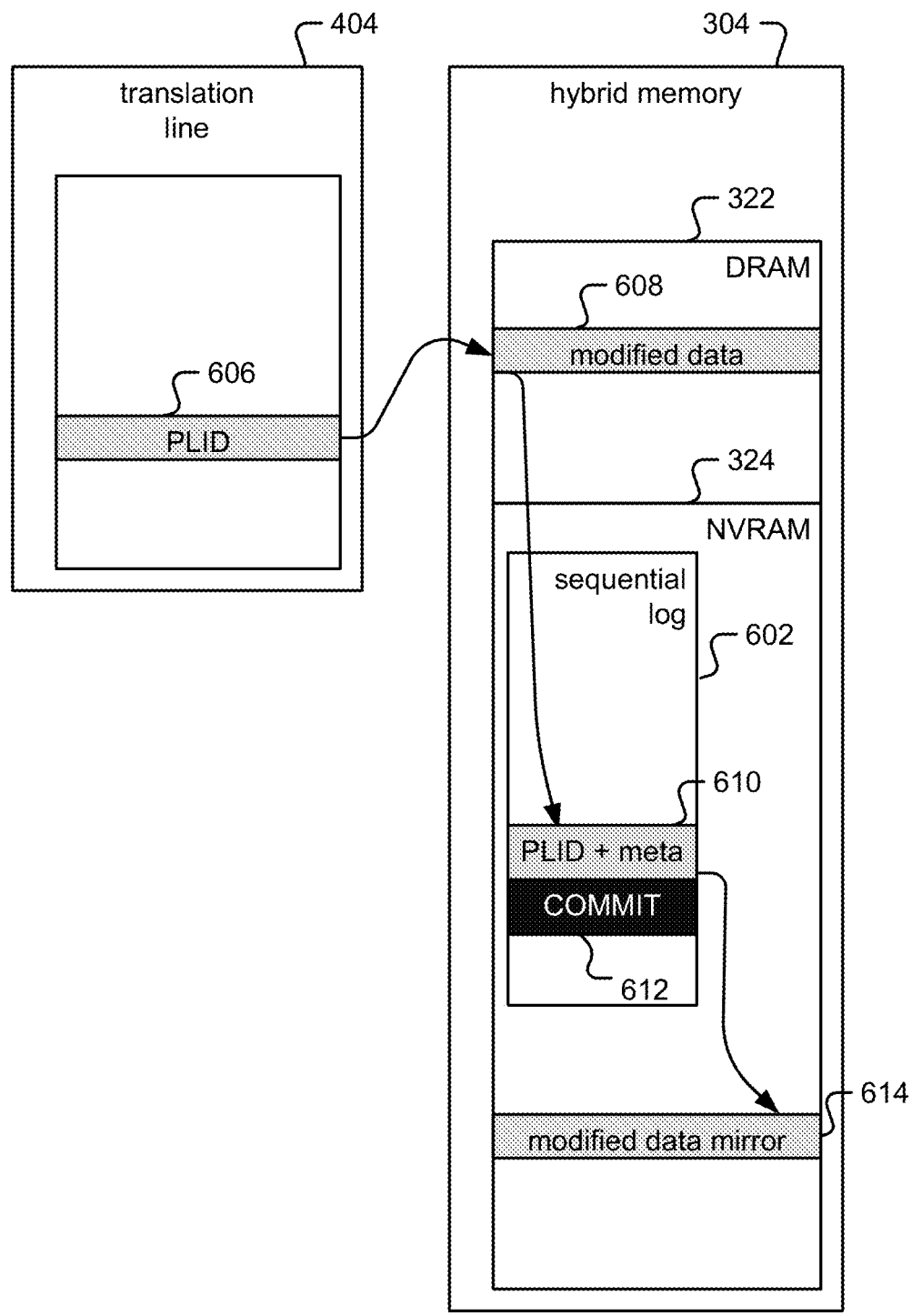
FIG. 6 is a conceptual illustration of how hybrid memory remapping provides transactional update support.

FIG. 6 is a conceptual illustration of how hybrid memory remapping provides transactional update support. In one embodiment, a portion of memory may be persisted as part of committing a transaction in the database sense of "atomic transaction". That is, the application provides a commit indication 612, causing the persisting of memory at a point of application consistency. In an embodiment, this portion of memory is persisted transactionally by writing the modified lines of memory to a log area 602 in the alternative memory area 324. For these pages, a committed page can be immediately reclaimed w/no write-back because it can be reconstructed from the log. An uncommitted page can be reclaimed by aborting the transaction. In expected practice, this latter approach is only taken under extreme memory duress, for example running out of memory. Thus, as shown in FIG. 6, a PLID 606 mapping to data line 608 that is then modified generates a log entry 610 including the PLID and other metadata. The modified data line 608 may be mirrored 614 in the NVRAM 324. Other sequential changes may be recorded to the log, for example an undo or a redo, with the singular atomic action being the writing of the commit record 612 to log. An undo log contains sequential undo data that extends backwards in time, just as a redo log contains sequential redo data that extends forward in time. The undo and redo logs may be stored together or separately without loss of generality, and in FIG. 6 are shown as log area 602.

In one embodiment, deduplication is used and this log 602 is simple for a hardware mechanism to generate as the difference between the current state of a segment and a snapshot of the segment from the time of the start of the transaction. In particular, the hardware mechanism can either scan for the "modified" metatag being set as stored in the translation line for each PLID or else PLID-compare this translation line to a corresponding line in the snapshot from the start of the transaction. In one embodiment, the PLID may refer to the identification of actual stored physical lines.

In one embodiment, the data written to the alternative memory area 324 is normally reduced significantly, both because the lines may correspond to line content already stored in the alternative memory area, and because one is writing back in line units, not page units. This is expected to be particularly beneficial when the page unit is larger than four kilobytes, such as two megabytes. Moreover, for some memory technologies, the writing of a log as sequentially filling up blocks of memory is far more efficient than random writes to memory, as supported by DRAM 322.

This log writeback may also support atomic transactions to update memory using standard write-ahead log techniques. That is, the modified lines are written to the log 602, possibly from several different pages and then on commit, a commit record 612 is written to the log 602 as a single atomic action, indicating that the changes are committed.

Using a persistent alternative memory technology 324, the transactional updates mean an increased probability that the memory state is left in a consistent state after a crash, because transactional updates that were in progress at the time of a crash are aborted. Thus, with applications and systems updating a large portion of the memory, in some cases with the exception of the process stack, the persistent memory state can be relied on to be consistent, allowing a system to reboot after a crash and start using this state from before the crash. This aspect may avoid the long recovery time required by systems with large main memories if they need to recover their state from disk. It also minimizes the risk of corrupted memory state as a result of a software crash. One concern with a software crash is that the application could be in the middle of updating a data structure at the time. The atomic update mechanism means that the change is effectively undone, leaving the data structure in the previous consistent state.

In one embodiment, an application can request a page as of a specified time, and have the memory system provide this page. In one case, it compares the specified time to that of the currently DRAM-stored 322 corresponding page that is closest in time to the desired time. If no such page exists, it instantiates a page from the checkpoint state in the alternative memory area 324. If the specified time is earlier, it can use the undo log 602 to revise the current page content back to the earlier time. If the time is later, it can use the redo log 602 to revise the current page contents to the later specified time. In each of these cases, a DRAM 322 instance of the page is created from the alternative memory 324 or another in DRAM, and then this instance is revised according to the log.

In one embodiment, the hardware memory controller 314 performs the rollback or rollforward of the page to the specified time, thereby avoiding having the processor incur the cache disruption of performing these actions in software.

In one embodiment, the application may access the page as described above without page faulting if the page in the checkpoint corresponds to the specified time, with the processor and the page table indicating timestamps on pages.

In one embodiment, line sharing between pages or using deduplication is supported, and the multiple copies of the same segment pages, just at different points in time are likely to contain considerable common data, allowing the deduplication mechanism to reduce memory requirements for these operations.

In one embodiment, the current committed state of the page is periodically written to the alternative memory area 324, recording this as a checkpoint of this page as of its commit time, thereby limiting the cost of reconstructing a page as of the current time.

In one embodiment, deduplication is used such that only the translation line and any data lines not already present in the alternative memory area 324 are written as part of writing this checkpoint of the page.

In some alternative memory technologies, such as flash memory, the use of logs 602 benefits from the efficiency of block reads over smaller reads. That is, it is efficient to read a plurality of log records in a single block read. Similarly, the log structure means that whole blocks of the log can be erased or rewritten at a later time, once the contents of the log have been subsumed by updates to the actual page contents in the alternative memory area.

In one embodiment, the undo/redo log 602 contains the undo/redo data as data lines aligned to line boundaries. Thus, the data lines for the committed state are already stored in the alternative memory area, so only the translation line needs to be written, in some cases until that portion of the log needs to be rewritten. In one embodiment, NVRAM 324 supports shared or deduplicated lines, and thus the log contains metadata that references data lines corresponding to the undo line and redo lines associated with an update, avoiding this data being duplicated between the log and the rest of NVRAM 324. The log may then be truncated by ensuring that the translation lines for each page indicated as modified in the portion of the log to be truncated have been updated to the data lines specified in the redo log.

With transactional pages, the sequential access to the logs on page reconstruction may minimize the penalty of block reading required of some alternative memory technologies. Moreover, having the memory controller perform the page construction reduces the latency and overhead for this reconstruction.

Figure 7:
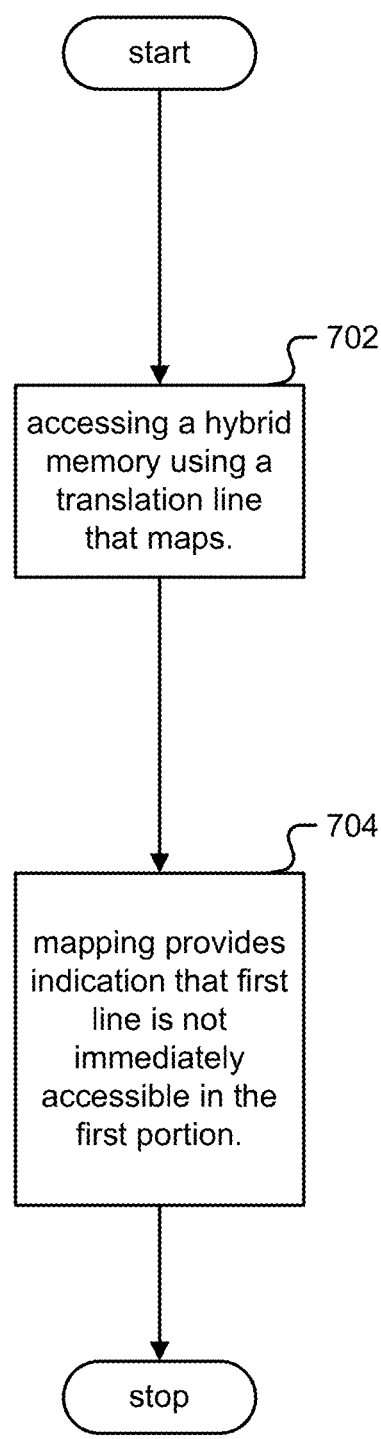
FIG. 7 is a block diagram illustrating a hybrid memory system.

FIG. 7 is a block diagram illustrating a hybrid memory system. A hybrid memory 304 comprises at least a first portion 322, wherein the hardware memory controller 314 coupled with the hybrid memory 304 is configured to (702) access a hybrid memory using a translation line, wherein the translation line maps a first physical address to a first line in the first portion 322. Said mapping provides an indication that the first line is not immediately accessible in the first portion (704), for example via a reserved value. This reserved value could be either a reserved address in the first portion, such as the max PLID for the first portion or it could be a tag in the translation line, in the sense of the metadata tags as described in U.S. patent application Ser. No. 13/712,878. For example, the controller 134 may also be configured to provide an indication that a second physical address maps to a second line that is not immediately accessible in the first portion 322.

In one embodiment, the translation line is "subpage", that is, a portion of, but not the entire, physical page. A physical address mapping at the granularity of a virtual memory page or larger is also possible although confers less benefit over just using the virtual memory mechanism to remap.

The hybrid memory may further comprise a second portion 324, wherein the first portion 322 has different characteristics (for example higher performance) than the second portion 324. The hardware memory controller 314 may be further configured to, based at least in part on the indication, remap the translation line, wherein the remapped translation line maps the second physical address to a line in the first portion. The second line may use the same or a separate data structure to determine its mapping. The hardware memory controller 314 may be further configured to receive a remapping of the translation line from an auxiliary module, for example an auxiliary controller, a software module in the operating system, or other hardware/software modules. The second line may also be unmapped in one embodiment, such than other intervention occurs when an associated processor attempts to access it. Remapping may include transferring line contents associated with the second physical address to the first portion 322.

The hardware memory controller 314 may be further configured to detect access to the second physical memory address, prior to providing an indication. As described above, the hardware memory controller may be further configured to prefetch other data lines and/or to remap other lines associated with a virtual memory page. Remapping the virtual memory page permits an associated processor to continue after the translation line maps at least one physical address to a line in the first memory, wherein in one embodiment permitting the associated processor to continue comprises permitting without incurring a blocking cost of a page-fault trap in an associated operating system.

As described above, the hardware memory controller 314 may be further configured to enable transaction update support and/or to support writing modified lines of memory to a log area 602 in the second portion 324. Writeback may be recorded in the log area 602, and the hardware memory controller 314 may be further configured to maintain an undo log area and a redo log area.

In one embodiment, supporting a hybrid main memory 304 in hardware comprises: using a memory controller 314 to remap at least in part by translating a plurality of physical memory addresses, each associated with a plurality of current content locations; associating the memory controller 314 with a hybrid main memory 304, wherein the hybrid main memory comprises a primary memory technology area 322 and an alternative memory technology area 324; associating the memory controller 314 with a processor 302; on read of a physical address that is currently stored in the alternative memory technology area 324, transferring the line 422 corresponding to the physical address in the alternative memory technology area 324 to the processor 302 and updating the mapping state 404 to associate this line with the primary memory area (to indicate its transferred location); and on write back of a data line from the processor 302, performing the write according to the remapping 432.

In one embodiment, when a first reference to a page is stored in the alternative memory area 324, it causes the virtual address to be remapped to a physical address (and thus new translation lines) associated with the primary memory area 322, the data line is located in the LLC 312 (that is, either transferred or determined to be already present, as can occur with deduplication), and the new translation line associated with this line (for example if it is just located in the LLC 312) is updated to indicate the line is associated with the primary memory area 322. In this association, it may be that the actual line location in the primary area 322 is only determined when this line is evicted from the LLC 312, if ever. The page may be discarded before eviction ever takes place so the line is never allocated space in the primary memory area. Also, with deduplication, on eviction, the memory controller 314 may determine that the line already exists in the primary memory area 322 and there may be no need to actually write the line to the primary memory area 322. Throughout this specification, without limitation the phrase "updating the mapping state" includes handling this scenario.

In one embodiment, the unit of transfer is a memory line. One or more translation lines may be used at least in part for remapping, each potentially remapping multiple data lines. In one embodiment, another translation line is updated to indicate availability of associated data lines in the primary memory technology area. Additional data lines referenced by another translation line may be prefetched into the primary memory technology area 322 after a reference to a line in the alternative memory technology area 324. In one embodiment, line sharing is provided between translation lines, line granularity deduplication is provided, and/or transactional update support is provided.

Other Hybrid Memory Schemes.

Previous hybrid memories, such as a hybrid PRAM/DRAM ("PDRAM"), as described by Dhiman et al., differs from that described in this specification in several significant ways. First, the PDRAM uses a conventional virtual memory page-granularity mapping of virtual addresses to physical addresses to map CPU accesses to either DRAM or PRAM whereas that described in this specification may use fine-grain (e.g. cache line) mapping of physical addresses to physical lines in DRAM 322 or in an alternative memory technology 324. Second, PDRAM requires, as one of its primary innovation, an "access map" whose sole purpose is to track the write frequency to pages to provide criteria to "page swap" a page between PRAM and DRAM when the write frequency is higher than suitable for PRAM, whereas that described in this specification may require no such access map. Third, PDRAM necessarily involves the transfer of a whole page of data between DRAM and PRAM or vice versa, whereas that described in this specification may allow transfer of line portions of a page, possibly with no page data movement at all. These differences arise in part because the primary focus for PDRAM is reducing the power consumption of DRAM, rather than increasing the overall capacity of main memory.

Benefits of a Hybrid Main Memory Using a Fine-Grain Level of Remapping

A computer, using for example the architecture in FIG. 3, may have multiple terabytes of main memory using hybrid memory 304, with its hybrid nature being largely transparent to software. Alternative memory technology 324 has substantially higher density than DRAM 322. For instance, an eight GB DRAM dual-inline memory module ("DIMM") can be replaced by a 400 GB flash DIMM for a 50× increase in capacity. There are also some significant benefits in packaging to have flash on DIMMs rather than requiring space for an SSD or PCI cards. Similar benefits apply to RRM, PCM and other alternative memory technologies.

As microelectronics technologies improve over time, LLCs become larger and the number of cores per processor increase, such that the frequency of LLC misses is expected to be less, so it is increasingly feasible to simply stall a core that is accessing data in alternative memory 324 until it has been transferred to DRAM 322. This approach eliminates the software overhead and latency of taking a trap into the operating system on access to state in alternative memory area 324.

Using transactional updates as described above the common case of server crash and recovery could be faster because the bulk of the main (hybrid) memory 304 could be ensured consistent by transactions and not require recovery. That is, the bulk of the hybrid memory would be in NVRAM 324 so would just require a cache warm-up after recovery to get back to full performance. Thus, time from crash to recovery, in some instances at reduced performance because of cold cache, would be lower than without the hybrid memory.

In one embodiment, translation lines are used such that:
1. for read, a core is suspended for at most the time to read two lines from NVRAM 324, namely the translation line and the requested data line, avoiding cost/delay of page fault and provide predictability vs. disk. This may be fast enough and/or infrequent enough that the system avoids a software context switch on the processor core on read, unlike a page fault. In an alternate embodiment, the processor could take a page fault on the first access, and resume as soon as the required data line is available;
2. cost of access to NVRAM 324 is amortized over several cache lines. That is, in some embodiments, after the translation miss, we manage to get the whole page available at DRAM latency for subsequent LLC requests; and
3. bandwidth/latency is reduced by deduplication of lines.

No Loss of Generality.

Although the disclosed has been described in terms of embodiments using DRAM 322 and an alternative memory technology such as flash 324, it can be practiced without loss of generality with other technologies. For example, the hybrid memory disclosed can be generalized to the case of having two different memory technologies within the main memory, not necessarily volatile 322 and non-volatile 324. The above can also be used with more than two memory technologies, where the remapping generally is migrating and remapping data to the technology best suited for its particular dynamic use at any given point in time, over a suitable period of time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hybrid memory system comprising:
a hybrid memory that includes a first portion; and
a hardware memory controller coupled with the hybrid memory, wherein the hardware memory controller is to:
access the hybrid memory with a first physical address, using a translation line, wherein the translation line is associated with a mapping of the first physical address to a first line in the first portion that is within a memory page, wherein the mapping provides an indication that the first line is not immediately accessible in the first portion, and the indication defines a reserved address in the first portion or a translation line tag.

2. The system of claim 1, wherein the hybrid memory further includes a second portion, wherein the first portion has different characteristics compared to the second portion.

3. The system of claim 2, wherein the first portion comprises volatile memory and the second portion comprises non-volatile memory.

4. The system of claim 2, wherein the hardware memory controller is to remap by transferring line contents associated with the second portion to the first portion.

5. The system of claim 2, wherein the hardware memory controller is to detect access to the second portion, prior to providing an access indication.

6. The system of claim 2, wherein a second line associated with the second portion is unmapped and then an intervention action occurs when an associated processor attempts to access the second line.

7. The system of claim 1, wherein the hardware memory controller is to, based at least in part on the indication, modify the translation line, wherein the modified translation line maps the first physical address to a first data line in the first portion that is readily accessible.

8. The system of claim 7, wherein a separate data structure is used to determine the modification of the translation line to map the first physical address to the first data line in the first portion.

9. The system of claim 1, wherein the hardware memory controller is to receive a remapping of the translation line from an auxiliary module.

10. The system of claim 1, wherein the hardware memory controller is to prefetch other data lines.

11. The system of claim 1, wherein the hardware memory controller is to remap lines associated with a virtual memory page.

12. The system of claim 11, wherein the lines associated with the virtual memory page that have been remapped by the hardware memory controller permits an associated processor to continue after the translation line has mapped the first physical address to the first line in the first portion.

13. The system of claim 11, wherein virtual address mapping is handled in software.

14. The system of claim 1, wherein the hardware memory controller is to provide transactional update support.

15. The system of claim 2, wherein the hardware memory controller is to support writing modified lines of memory to a log area in the second portion.

16. The system of claim 15, wherein the modified lines of memory of writeback are recorded in the log area.

17. The system of claim 1, wherein the hardware memory controller is to maintain an undo log area and a redo log area.

18. A method, comprising:
  accessing a hybrid memory with a first physical memory address using a translation line, wherein the hybrid memory includes a first portion,
  the translation line is associated with a mapping of the first physical memory
  address to a first line in the first portion that is within a memory page,
  the mapping provides an indication that the first line is not immediately accessible in the first portion,
  and the indication defines a reserved address in the first portion or a translation line tag.

19. A method of supporting a hybrid main memory in hardware, comprising:
  using a memory controller to remap at least in part by translating a plurality of physical memory addresses respectively associated with a plurality of current content locations;
  associating the memory controller with the hybrid main memory, wherein the hybrid main memory includes a primary memory technology area and an alternative memory technology area;
  associating the memory controller with a processor; and
  on read of a physical address associated with an alternative data line that is currently stored in the alternative memory technology area, transferring the alternative data line to the processor and updating a mapping state to associate the physical address associated with the alternative data line with the primary memory technology area, wherein the alternative data line is a portion of a memory page.

20. The method of claim 19, wherein a unit of transfer associated with transferring the alternative data line to the processor is a memory line.

21. The method of claim 19, wherein one or more translation lines are used at least in part for remapping, and each of the one or more translations lines is to potentially remap multiple data lines.

22. The method of claim 19, comprising updating another translation line to indicate availability of associated data lines in the primary memory technology area.

23. The method of claim 19, comprising prefetching additional data lines referenced by another translation line into the primary memory technology area after a reference to the alternative data line.

24. The method of claim 19, comprising providing line sharing between translation lines.

25. The method of claim 19, comprising providing line granularity deduplication.

26. The method of claim 19, comprising providing transactional update support.

27. The method of claim 19, comprising, on write back of a data line from the processor, performing a write according to the update to the mapping state.

\* \* \* \* \*